US012500749B2

(12) United States Patent
Veerupakshappa et al.

(10) Patent No.: US 12,500,749 B2
(45) Date of Patent: Dec. 16, 2025

(54) QUANTUM-BASED ENCRYPTION

(71) Applicant: Bank of America Corporation, Charlotte, NC (US)

(72) Inventors: Raghavendra Veerupakshappa, Telangana (IN); Umme Kulsum Shaik, Hyderabad (IN); John Dinakar Iruvanti, Telangana (IN); Nagaraja Peddi, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 323 days.

(21) Appl. No.: 18/128,564

(22) Filed: Mar. 30, 2023

(65) Prior Publication Data

US 2024/0333481 A1    Oct. 3, 2024

(51) Int. Cl.
*H04L 9/08* (2006.01)
*G06N 10/20* (2022.01)

(52) U.S. Cl.
CPC ........... *H04L 9/0852* (2013.01); *G06N 10/20* (2022.01)

(58) Field of Classification Search
CPC .............................. H04L 9/0852; G06N 10/20
See application file for complete search history.

(56) References Cited

U.S. PATENT DOCUMENTS

| | | | |
|---|---|---|---|
| 7,246,240 B2 | 7/2007 | Chuang et al. | |
| 7,620,182 B2 | 11/2009 | Berzanskis et al. | |
| 7,849,121 B2 | 12/2010 | Fiorentino et al. | |
| 8,340,298 B2 | 12/2012 | Gelfond et al. | |
| 8,484,455 B2 | 7/2013 | Varghese et al. | |
| 8,634,066 B1 | 1/2014 | Fraser | |
| 8,762,728 B2 | 6/2014 | Wiseman | |
| 8,787,566 B2 | 7/2014 | Relyea | |
| 9,049,010 B2 | 6/2015 | Jueneman et al. | |
| 9,521,123 B2 | 12/2016 | Jueneman et al. | |
| 10,797,869 B1 | 10/2020 | Vakili | |
| 10,802,800 B1 | 10/2020 | Vakili | |
| 10,855,454 B1 | 12/2020 | Vakili | |
| 10,855,457 B1 * | 12/2020 | Vakili | ................... H04L 9/0869 |
| 11,025,416 B1 | 6/2021 | Vakili | |
| 11,095,439 B1 | 8/2021 | Vakili | |
| 11,163,535 B1 | 11/2021 | Vakili | |
| 11,240,013 B1 | 2/2022 | Vakili | |
| 11,245,519 B1 * | 2/2022 | Stapleton, Jr. | ........ H04L 9/0855 |

(Continued)

*Primary Examiner* — Jason Chiang
(74) *Attorney, Agent, or Firm* — Banner & Witcoff, Ltd.

(57) ABSTRACT

Arrangements for quantum-based encryption are provided. In some aspects, input data and a superposition collapse value associated with the input data may be received from a user computing device. In addition, the superposition collapse value may include a threshold percentage indicating a percentage of quantum bits to be collapsed. The input data may be converted into a set of quantum bits. Superpositions of the set of quantum bits may be collapsed based on the superposition collapse value. In addition, collapsing the superpositions may include forcing each quantum bit of the set of quantum bits to take a single value. An encoded result of the input data may be obtained by determining quantum states of the collapsed set of quantum bits. The encoded result of the input data may be converted into alphanumeric code and stored in a data store with the superposition collapse value associated with the input data.

20 Claims, 11 Drawing Sheets

(56) References Cited

U.S. PATENT DOCUMENTS

| | | | |
|---|---|---|---|
| 11,343,087 B1* | 5/2022 | Vakili | H04L 9/3228 |
| 11,663,510 B1* | 5/2023 | Carter, Jr. | B82Y 10/00 |
| | | | 257/31 |
| 11,895,232 B1* | 2/2024 | Stapleton | H04L 9/0861 |
| 11,934,543 B1* | 3/2024 | Bi | G06F 21/604 |
| 12,200,116 B1* | 1/2025 | Rao | H04L 9/0852 |
| 12,231,416 B1* | 2/2025 | Stapleton | H04L 63/08 |
| 12,244,699 B1* | 3/2025 | Bordow | H04L 9/0866 |
| 2001/0021254 A1* | 9/2001 | Furuya | H04L 9/0625 |
| | | | 380/259 |
| 2003/0121028 A1 | 6/2003 | Coury et al. | |
| 2006/0056630 A1 | 3/2006 | Zimmer et al. | |
| 2008/0069341 A1 | 3/2008 | Relyea | |
| 2009/0300362 A1 | 12/2009 | Shaik | |
| 2010/0208886 A1 | 8/2010 | Boehl et al. | |
| 2012/0278876 A1 | 11/2012 | Mcdonald | |
| 2013/0010955 A1 | 1/2013 | Lu et al. | |
| 2013/0108040 A1 | 5/2013 | Luukkala et al. | |
| 2014/0359744 A1* | 12/2014 | Hillis | G06F 21/36 |
| | | | 726/9 |
| 2015/0150140 A1* | 5/2015 | Biswas | G06F 1/1652 |
| | | | 726/26 |
| 2015/0295708 A1 | 10/2015 | Howe et al. | |
| 2015/0310444 A1* | 10/2015 | Chen | G06Q 20/308 |
| | | | 705/44 |
| 2016/0062735 A1* | 3/2016 | Wilber | G06F 40/35 |
| | | | 708/250 |
| 2016/0112872 A1 | 4/2016 | McClement et al. | |
| 2017/0126654 A1* | 5/2017 | Fu | H04L 9/0858 |
| 2017/0250805 A1 | 8/2017 | Kwiat et al. | |
| 2018/0039903 A1* | 2/2018 | Mosca | B82Y 10/00 |
| 2018/0097816 A1* | 4/2018 | Naqvi | H04L 63/107 |
| 2018/0240032 A1* | 8/2018 | van Rooyen | G16B 30/00 |
| 2020/0219094 A1 | 7/2020 | Dikhit | H04L 9/0822 |
| 2021/0109707 A1 | 4/2021 | McCarty | H04L 9/3236 |
| 2021/0111898 A1 | 4/2021 | McCarty | H04L 9/3213 |
| 2021/0135860 A1 | 5/2021 | Bucklew | H04L 9/0858 |
| 2022/0215279 A1 | 7/2022 | Rahman | G01C 19/72 |
| 2022/0345298 A1* | 10/2022 | Cap | H04L 9/0869 |
| 2023/0013217 A1* | 1/2023 | Wu | G06N 10/60 |
| 2023/0058053 A1* | 2/2023 | Hunt | H04L 9/3271 |
| 2023/0229950 A1* | 7/2023 | Selly | G16B 35/20 |
| 2023/0353348 A1* | 11/2023 | Ganguly | H04L 9/3226 |
| 2023/0385676 A1* | 11/2023 | Mentovich | G06N 10/60 |
| 2024/0073010 A1* | 2/2024 | Ganguly | H04L 63/083 |
| 2024/0333481 A1* | 10/2024 | Veerupakshappa | H04L 9/0852 |
| 2024/0346157 A1* | 10/2024 | Flatow | G06F 21/602 |

* cited by examiner

QUANTUM-BASED ENCRYPTION

BACKGROUND

Aspects of the disclosure generally relate to quantum computers, systems, and devices. In particular, one or more aspects of the disclosure relate to an encryption solution leveraging quantum computing technology.

Encryption is a security method of encoding information or data to prevent unauthorized access. Conventional cryptographic systems use binary bits to encode information, and since binary bits are static in nature and have fixed values, such systems are vulnerable to attacks by software programs or hackers. For example, a threat actor can apply mathematical logic such as combinations or permutations to find a desired value. Accordingly, it may be advantageous to leverage quantum computing capabilities to keep cryptographic systems safe from vulnerabilities and breaches.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with quantum-based encryption. In accordance with one or more embodiments, a computing platform having at least one processor, a communication interface, and memory may receive, via the communication interface, from a user computing device, input data and a superposition collapse value associated with the input data. In addition, the superposition collapse value may include a threshold percentage indicating a percentage of quantum bits to be collapsed. The computing platform may convert, using quantum computing, the input data into a set of quantum bits. The computing platform may collapse, using quantum computing, superpositions of the set of quantum bits based on the superposition collapse value. In addition, collapsing the superpositions may include forcing each quantum bit of the set of quantum bits to take a single value. The computing platform may obtain an encoded result of the input data by determining, using quantum computing, quantum states of the collapsed set of quantum bits. The computing platform may convert the encoded result of the input data into alphanumeric code. The computing platform may store the encoded result of the input data and the superposition collapse value associated with the input data in a data store.

In some aspects, the computing platform may receive, via the communication interface, from a user computing device, second input data corresponding to the input data. The computing platform may convert, using quantum computing, the second input data into a second set of quantum bits. The computing platform may extract the stored superposition collapse value associated with the input data. The computing platform may collapse, using quantum computing, superpositions of the second set of quantum bits based on the stored superposition collapse value. The computing platform may obtain a second encoded result of the second input data by determining, using quantum computing, quantum states of the collapsed second set of quantum bits. The computing platform may convert the second encoded result into alphanumeric code. The computing platform may compare the second encoded result to the stored encoded result. Responsive to determining that the second encoded result matches the stored encoded result, the computing platform may authenticate the user. Responsive to determining that the second encoded result does not match the stored encoded result, the computing platform may generate a request for additional authentication data.

In some example arrangements, the input data may include one or more of: a user name, a password, an Internet Protocol address, or a domain name.

In some embodiments, the computing platform may transmit, via the communication interface, a notification to the user computing device of an encryption status of the input data. In addition, transmitting the notification may include causing the notification to display on the user computing device.

In some arrangements, storing may include storing the encoded result and the superposition collapse value in a cloud database. In some examples, storing may include storing the encoded result and the superposition collapse value in a persistent data store.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to an encryption solution that leverages quantum computing technology. In particular, one or more aspects of the disclosure may leverage quantum computing capabilities to encrypt or encode plain text into ciphertext by converting input data into quantum bits (qubits), collapse superpositions at a threshold, generate encrypted qubits, and convert the encrypted qubits into alphanumeric code such that humans or machines would be unable to predict or break the quantum result/output. Additional aspects of the disclosure may store the encoded result with the superposition collapse value and send notifications to downstream systems or users. Additional aspects of the disclosure may use superposition and entanglement techniques to encode and/or decode data.

These and various other arrangements will be discussed more fully below.

Figure 1A:
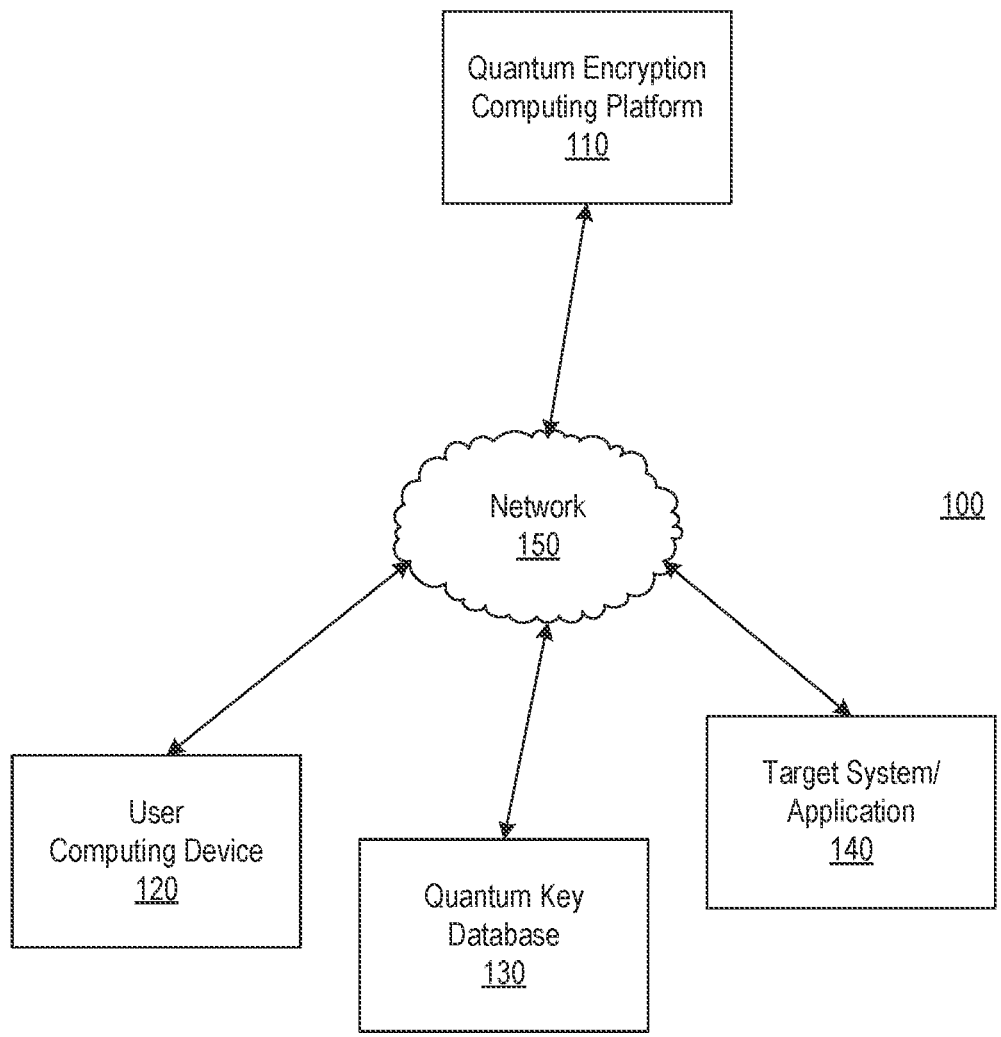
FIGS. 1A and 1B depict an illustrative computing environment for quantum-based encryption in accordance with one or more arrangements discussed herein.
Figure 1B:
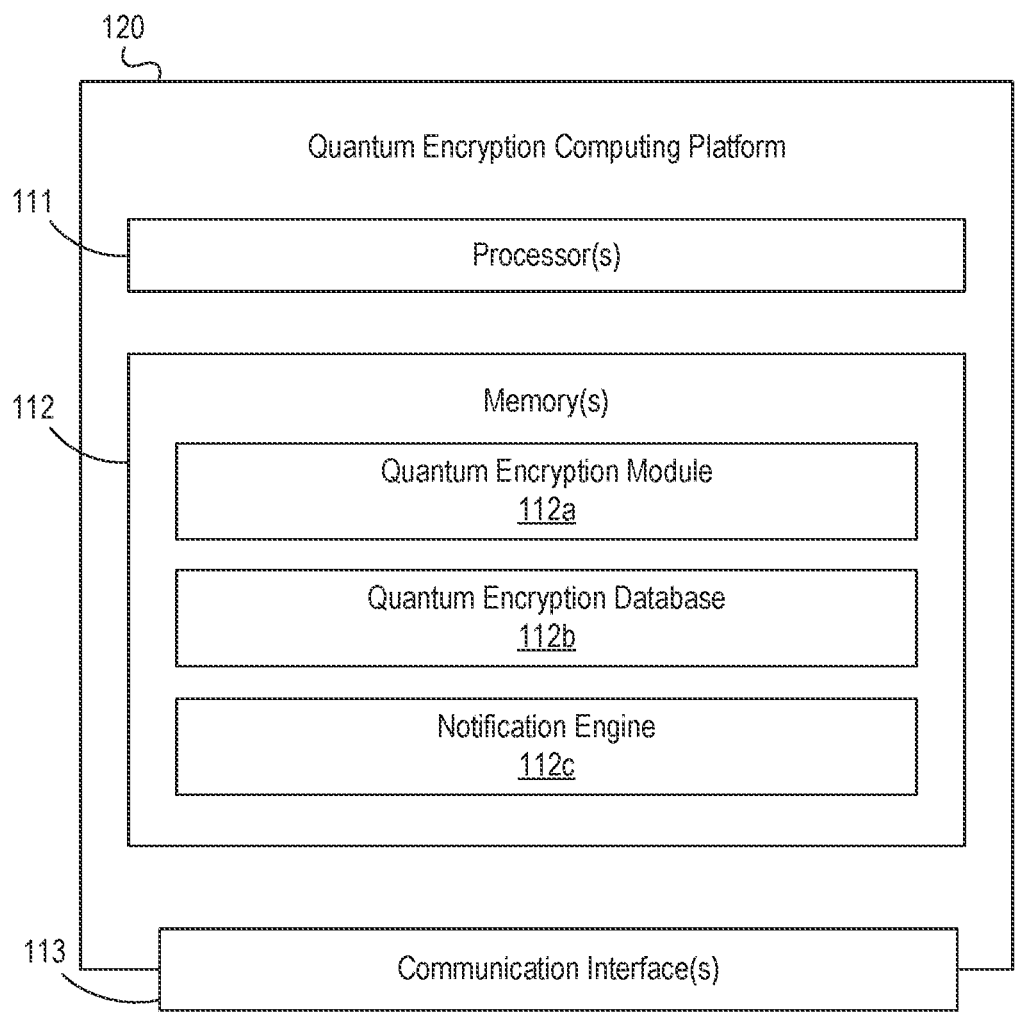

Aspects described herein may be implemented using one or more computing devices operating in a computing environment. For instance, FIGS. 1A and 1B depict an illustrative computing environment for quantum-based encryption in accordance with one or more example arrangements. Referring to FIG. 1A, computing environment 100 may include one or more computing devices and/or other computing systems. For example, computing environment 100 may include quantum encryption computing platform 110, user computing device 120, quantum key database 130, and/or target system/application 140. Although one user computing device 120 and one target system 140 are shown, any number of systems or devices may be used without departing from the disclosure.

As described further below, quantum encryption computing platform 110 may include one or more computing devices configured to perform one or more of the functions described herein. For example, quantum encryption computing platform 110 may include one or more computers (e.g., laptop computers, desktop computers, servers, server blades, or the like) configured to perform quantum-based encryption and/or one or more other functions described herein. Among other functions, quantum encryption computing platform 110 ensures the security of data by leveraging quantum computing capabilities.

User computing device 120 may include one or more computing devices and/or other computer components (e.g., processors, memories, communication interfaces). For example, user computing device 120 may be a desktop computing device (e.g., desktop computer, terminal), or the like or a mobile computing device (e.g., smartphone, tablet, smart watch, laptop computer, or the like) used by users interacting with quantum encryption computing platform 110.

Quantum key database 130 may include one or more computing devices and/or other computer components (e.g., processors, memories, communication interfaces) that may store encoded credentials. Quantum key database 130 may include distinct and physically separate data centers or other groupings of server computers that are operated by and/or otherwise associated with an organization, such as a financial institution. In some examples, quantum key database 130 may be an internal database within quantum encryption computing platform 110. In some examples, quantum key database 130 may be and/or include catalogue for storing encoded credentials (e.g., a table of stored data arranged in rows and columns). In some instances, different sets of credentials for different applications may be encrypted and stored in quantum key database 130.

Target system/application 140 may include one or more computing devices or systems (e.g., servers, server blades, or the like) including one or more computer components (e.g., processors, memory, or the like) configured to create, store, manipulate, manage, provide access to, and/or otherwise maintain identity information, such as for identity management. In some target system 140 may include cloud-based storage. In some examples, target system 140 may be and/or include an enterprise system or application configured to read and store information from quantum key database 130.

Computing environment 100 also may include one or more networks, which may interconnect one or more of quantum encryption computing platform 110, user computing device 120, quantum key database 130, and target system 140. For example, computing environment 100 may include a network 150 (which may, e.g., interconnect quantum encryption computing platform 110, user computing device 120, quantum key database 130, target system 140, and/or one or more other systems which may be associated with an enterprise organization, such as a financial institution, with one or more other systems, public networks, sub-networks, and/or the like).

In one or more arrangements, quantum encryption computing platform 110, user computing device 120, quantum key database 130, and target system 140 may be any type of computing device capable of receiving a user interface, receiving input via the user interface, and communicating the received input to one or more other computing devices. For example, quantum encryption computing platform 110, user computing device 120, quantum key database 130, target system 140, and/or the other systems included in computing environment 100 may, in some instances, include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions as described herein.

Referring to FIG. 1B, quantum encryption computing platform 110 may include one or more processors 111, memory 112, and communication interface 113. A data bus may interconnect processor(s) 111, memory 112, and communication interface 113. Communication interface 113 may be a network interface configured to support communication between quantum encryption computing platform 110 and one or more networks (e.g., network 150, or the like). Memory 112 may include one or more program modules having instructions that when executed by processor(s) 111 cause quantum encryption computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of quantum encryption computing platform 110 and/or by different computing devices that may form and/or otherwise make up quantum encryption computing platform 110.

For example, memory 112 may have, store and/or include a quantum encryption module 112a, a quantum encryption database 112b, and a notification engine 112c. Quantum encryption module 112a, may have instructions that direct and/or cause quantum encryption computing platform 110 to, for instance, use quantum computing capabilities to encrypt/encode text, collapse superpositions at a threshold, generate encrypted qubits, convert encrypted qubits into alphanumeric code, and/or instructions that direct quantum encryption computing platform 110 to perform other functions, as discussed in greater detail below. Quantum encryption database 112b may store information used by quantum encryption module 112a and/or quantum encryption computing platform 110 in performing quantum-based encryption and/or in performing other functions, as discussed in greater detail below. Notification engine 112c may have instructions that direct and/or cause quantum encryption computing platform 110 to push notifications back to an end user device, notify users of an encryption status, alert users that a login has failed, and/or perform other functions, as discussed in greater detail below.

FIGS. 2A-2E depict one example illustrative event sequence for quantum-based encryption in accordance with one or more aspects described herein. The events shown in the illustrative event sequence are merely one example sequence and additional events may be added, or events may be omitted, without departing from the disclosure. Further, one or more processes discussed with respect to FIGS. 2A-2E may be performed in real-time or near real-time.

Figure 2A:
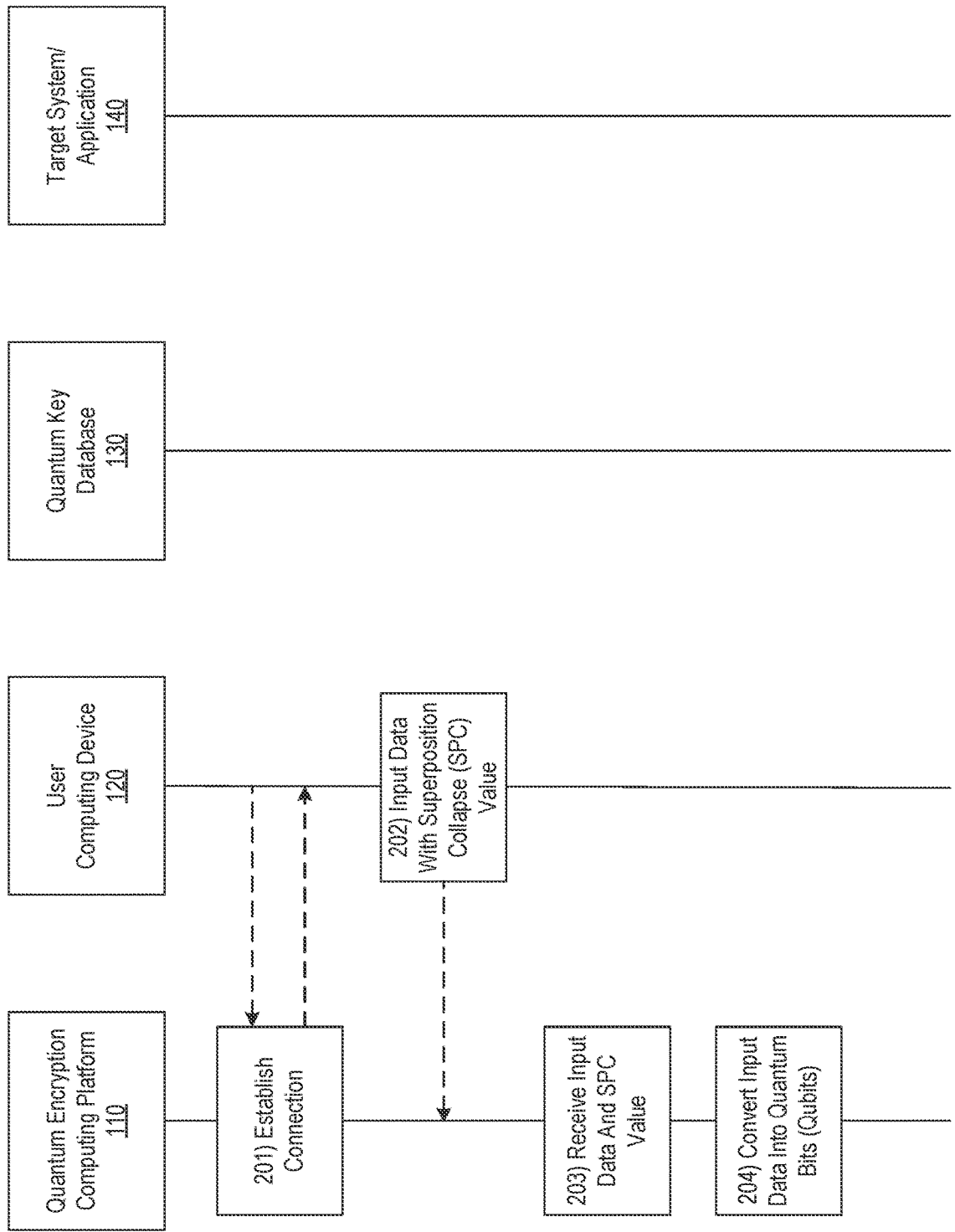
FIGS. 2A-2E depict an illustrative event sequence for quantum-based encryption in accordance with one or more arrangements discussed herein.

With reference to FIG. 2A, at step 201, quantum encryption computing platform 110 may connect to user computing device 120. For instance, a first wireless connection may be established between quantum encryption computing platform 110 and user computing device 120. Upon establishing the first wireless connection, a communication session may be initiated between quantum encryption computing platform 110 and user computing device 120.

At step 202, a user computing device (e.g., user computing device 120) may receive, via the communication interface (e.g., communication interface 113), user inputs including data for encryption, and a superposition collapse (SPC) value associated with the input data, and transmit/send the user inputs to quantum encryption computing platform 110. In some examples, the input data may be and/or include credentials or other confidential information for encryption. For instance, the input data may include one or more of: a user name, a password, an Internet Protocol address, a domain name, or the like. It will be appreciated that other and/or additional inputs may be implemented without departing from the scope of the present disclosure.

Figure 3:
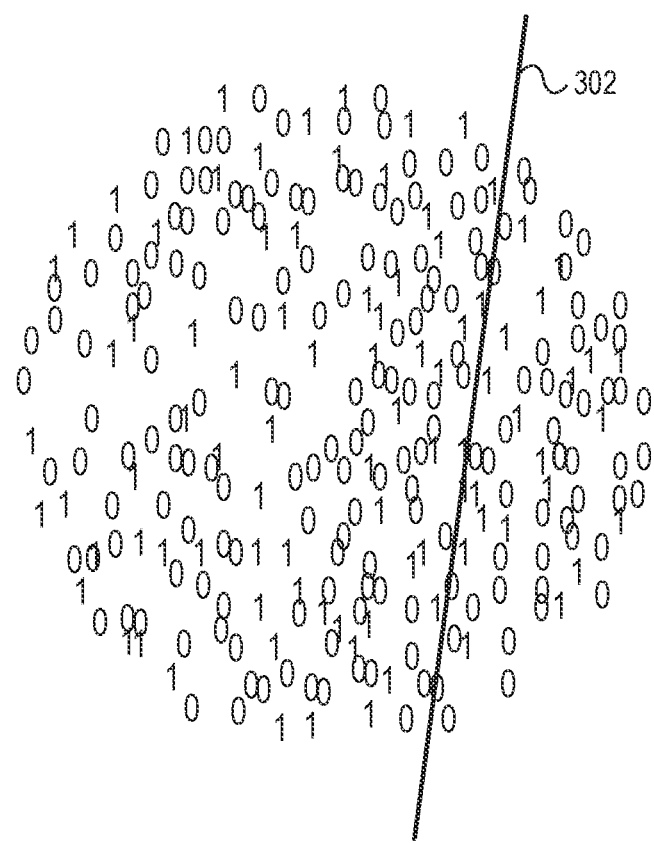
FIG. 3 depicts simplified illustration for collapsing superpositions of quantum bits based on a superposition collapse value in accordance with one or more arrangements discussed herein.

In turn, at step 203, quantum encryption computing platform 110 may receive, via the communication interface (e.g., communication interface 113), the user inputs (e.g., input data and the superposition collapse value) from the user computing device (e.g., user computing device 120). In some examples, the superposition collapse value may be and/or include a threshold percentage indicating a percentage of quantum bits to be collapsed. For example, FIG. 3 depicts a simplified illustration for collapsing superpositions of quantum bits based on a superposition collapse value in accordance with one or more aspects described herein. For instance, FIG. 3 illustrates an SPC value (e.g., a threshold value) of approximately seventy-five percent (75%), as indicated by line 302 (e.g., with a range, going from left to right, of zero to one hundred percent). It will be appreciated that other and/or different SPC values may be implemented without departing from the scope of the present disclosure.

Returning to FIG. 2A, at step 204, quantum encryption computing platform 110 may convert, using quantum computing, the input data into a set of quantum bits (qubits). Because qubits can be entangled, and information can be stored in superposition, quantum computers are exponentially more powerful than a classical computer and can compute at speeds that dwarf the fastest classical computer.

Figure 2B:
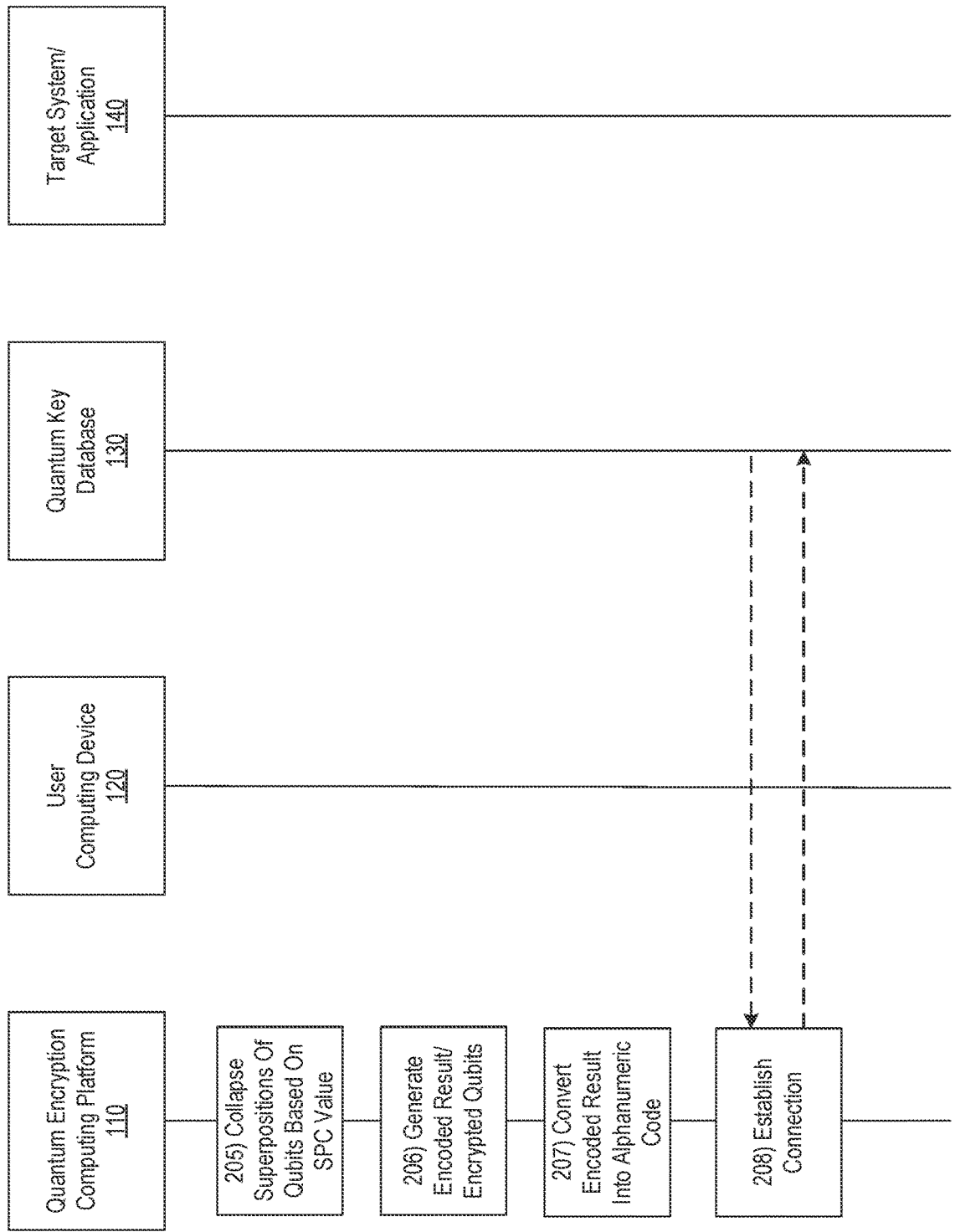

With reference to FIG. 2B, at step 205, quantum encryption computing platform 110 may collapse, using quantum computing, superpositions of the set of quantum bits based on the superposition collapse value. In some examples, collapsing the superpositions may include forcing each quantum bit of the set of quantum bits to take a single value. For instance, a quantum computer with several qubits in superposition can calculate a vast number of potential outcomes simultaneously, and the final result is determined once the qubits are measured (e.g., causing their quantum state to "collapse" to either "1" or "0").

At step 206, once the qubit superpositions have been collapsed, quantum encryption computing platform 110 may generate or obtain an encoded/encrypted result of the input data by determining/measuring, using quantum computing, quantum states of the collapsed set of quantum bits. In measuring the quantum states of the collapsed set of quantum bits, the properties of quantum entanglement could be used to know the state of another qubit when measuring the state of one qubit. The result may be in the form of encrypted qubits. At step 207, quantum encryption computing platform 110 may convert the encoded result of the input data into alphanumeric code.

At step 208, quantum encryption computing platform 110 may connect to quantum key database 130. For instance, a second wireless connection may be established between quantum encryption computing platform 110 and quantum key database 130. Upon establishing the second wireless connection, a communication session may be initiated between quantum encryption computing platform 110 and quantum key database 130.

Figure 2C:
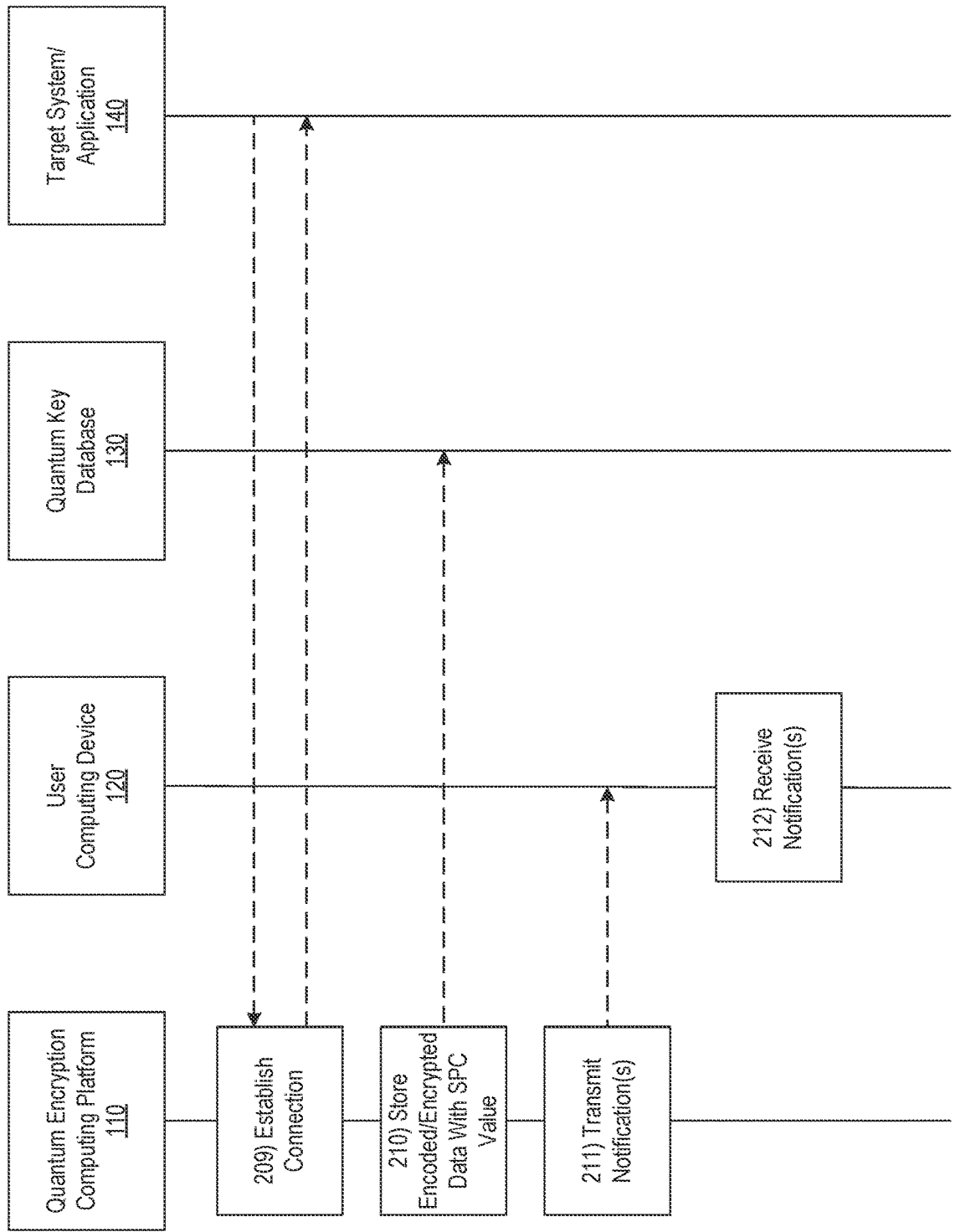

With reference to FIG. 2C, at step 209, quantum encryption computing platform 110 may connect to target system 140. For instance, a third wireless connection may be established between quantum encryption computing platform 110 and target system 140. Upon establishing the third wireless connection, a communication session may be initiated between quantum encryption computing platform 110 and target system 140.

At step 210, quantum encryption computing platform 110 may store the encoded result of the input data and the superposition collapse value associated with the input data in an internal data store (e.g. quantum key database 130). In some examples, the encoded result and the superposition collapse value may be stored in cloud storage (e.g., of target system 140). In some examples, hybrid cloud storage may be used (e.g., a storage infrastructure that uses a combination of on-premises storage resources with a cloud storage provider). In some embodiments, the encoded result and the superposition collapse value may be stored in a persistent data store (e.g., where data is stored until deletion) rather than in session data storage (e.g., where stored data is cleared out when a browser is closed).

In some embodiments, at step 211, quantum encryption computing platform 110 may transmit, via the communication interface (e.g., user computing device 120), notifications to downstream systems or users. For instance, quantum encryption computing platform 110 may generate and transmit a notification to the user computing device (e.g., user computing device 120) of an encryption status of the input data. Additionally or alternatively, target system 140, which reads and stores information from quantum key database 130, may transmit the notification to the user computing device (e.g., user computing device 120).

Figure 4:
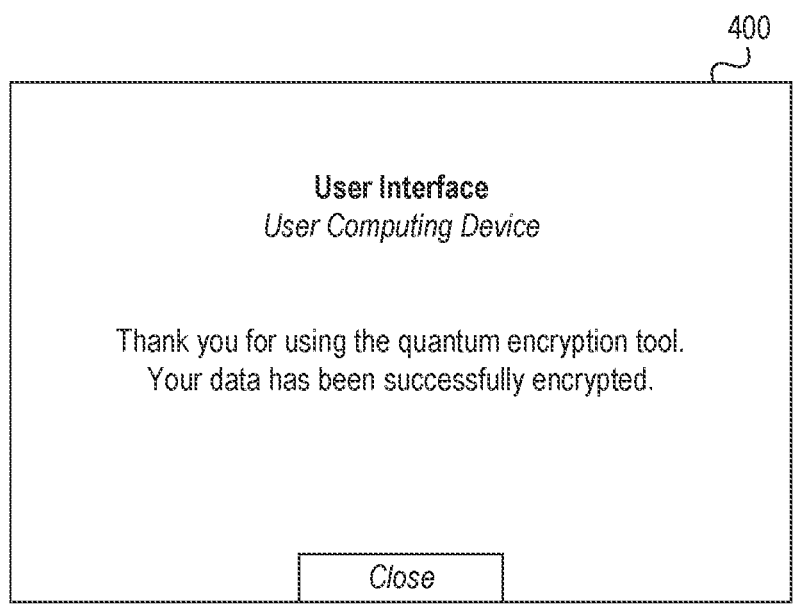
FIG. 4 depicts an example graphical user interface for quantum-based encryption in accordance with one or more arrangements discussed herein.

In some examples, transmitting the notification may cause the notification to be displayed on a display of the user computing device (e.g., user computing device 120). At step 212, the user computing device (e.g., user computing device 120) may receive and display the notification. For instance, the user computing device (e.g., user computing device 120) may display and/or otherwise present one or more graphical user interfaces similar to graphical user interface 400, which is illustrated in FIG. 4. As seen in FIG. 4, graphical user interface 400 may include text and/or other information associated with providing a notification regarding the quantum-based encryption (e.g., "Thank you for using the quantum encryption tool. Your data has been successfully encrypted."). It will be appreciated that other and/or different notifications may also be provided.

Figure 2D:
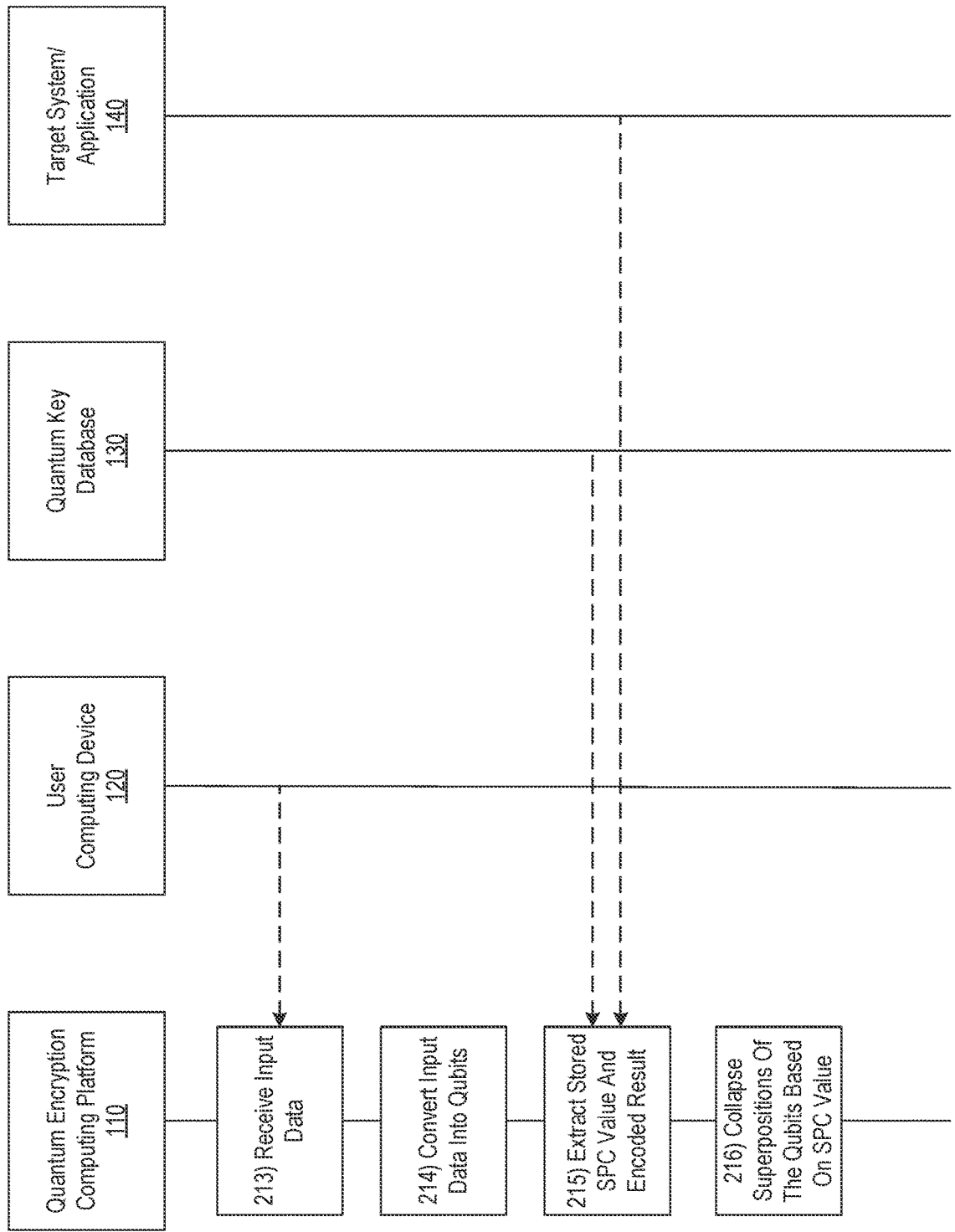

With reference to FIG. 2D, in some embodiments, at step 213, quantum encryption computing platform 110 may receive, via the communication interface (e.g., communication interface 113), from a user computing device (e.g., user computing device 120), second (or subsequent) input data corresponding to the input data (e.g., input data received at step 203). At step 214, quantum encryption computing platform 110 may convert, using quantum computing, the second input data into a second set of quantum bits.

At step 215, quantum encryption computing platform 110 may extract the stored superposition collapse value associated with the input data (e.g., from quantum key database 130). In some instances, different sets of credentials for different applications may be encrypted and stored in quantum key database 130, and upon user input, quantum encryption computing platform 110 may retrieve the appropriate corresponding set of credential information. At step 216, quantum encryption computing platform 110 may collapse, using quantum computing, superpositions of the second set of quantum bits based on the stored superposition collapse value.

Figure 2E:
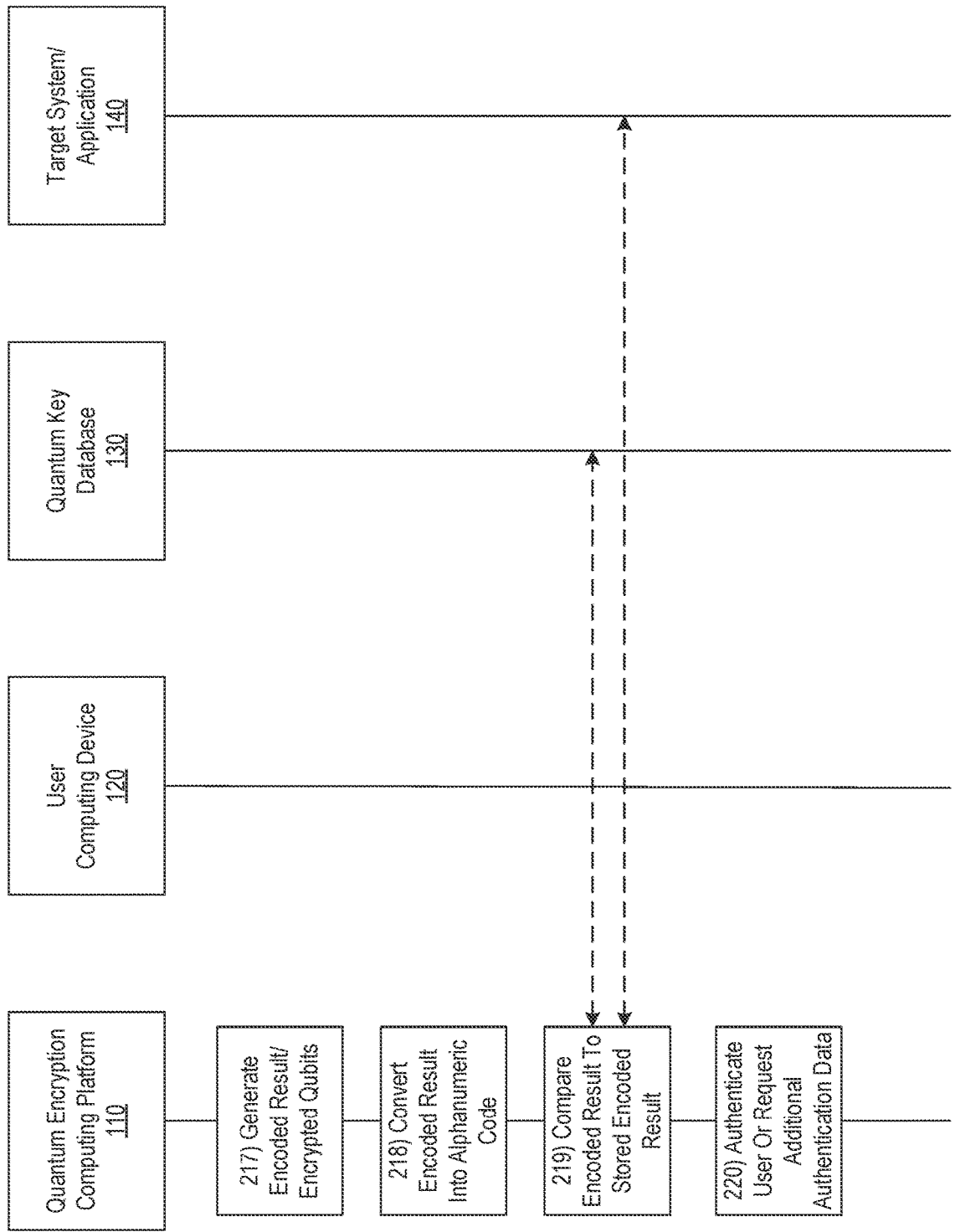

With reference to FIG. 2E, at step 217, quantum encryption computing platform 110 may obtain a second encoded result of the second input data by determining, using quantum computing, quantum states of the collapsed second set of quantum bits. At step 218, quantum encryption computing platform 110 may convert the second encoded result into alphanumeric code. At step 219, quantum encryption computing platform 110 may compare the second encoded result to the stored encoded result and a determination may be made as to whether the second encoded result matches the stored encoded result. If so, the user may be authenticated at step 220. If the second encoded result does not match the stored encoded result, in some examples, additional authentication data may be requested at step 221.

Figure 5A:
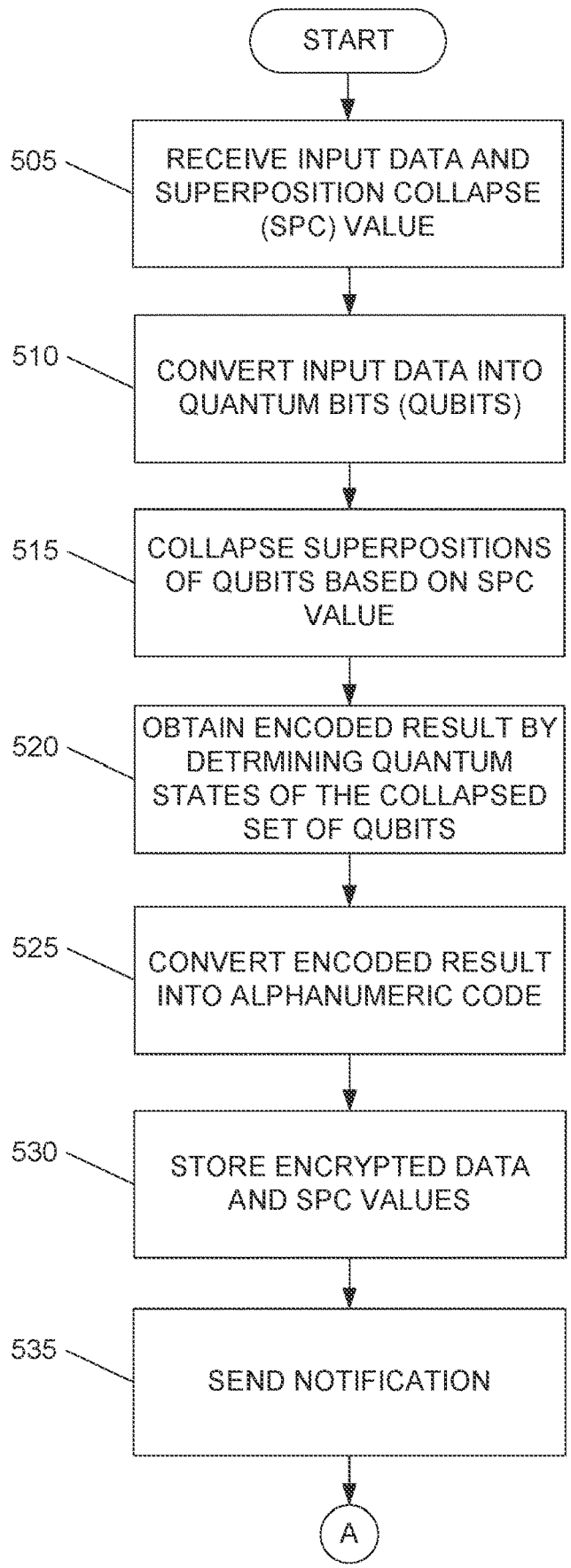
FIGS. 5A-5B depict an illustrative method for quantum-based encryption in accordance with one or more arrangements discussed herein.
Figure 5B:
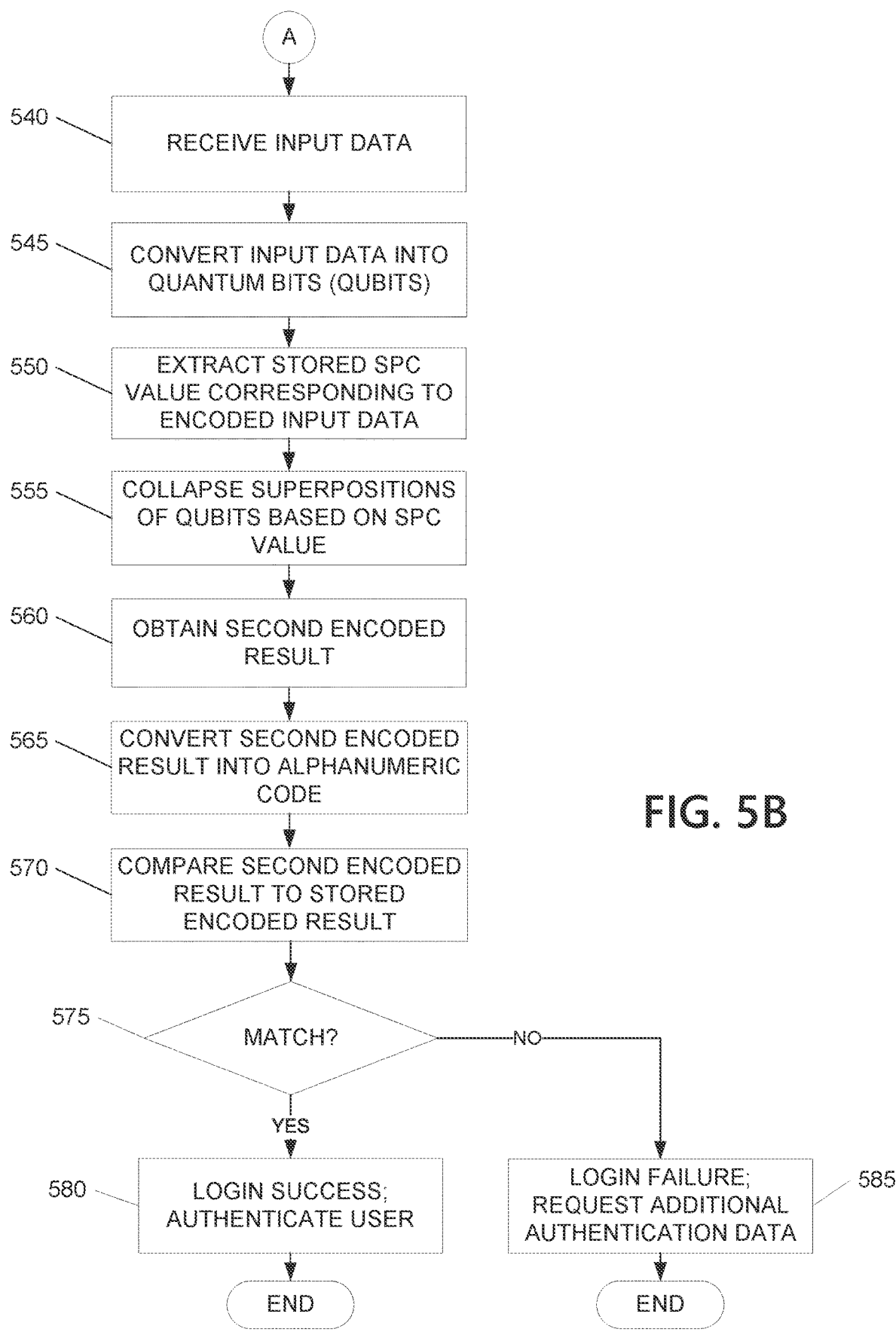

FIGS. 5A-5B depict an illustrative method for quantum-based encryption in accordance with one or more example embodiments. With reference to FIG. 5A, at step 505, a computing platform having at least one processor, a communication interface, and memory may receive, from a user computing device, input data and a superposition collapse value associated with the input data. In addition, the superposition collapse value may include a threshold percentage indicating a percentage of quantum bits to be collapsed. At step 510, the computing platform may convert, using quantum computing, the input data into a set of quantum bits. At step 515, the computing platform may collapse, using quantum computing, superpositions of the set of quantum bits based on the superposition collapse value. In addition, collapsing the superpositions may include forcing each quantum bit of the set of quantum bits to take a single value. At step 520, the computing platform may obtain an encoded result of the input data by determining, using quantum computing, quantum states of the collapsed set of quantum bits. At step 525, the computing platform may convert the encoded result of the input data into alphanumeric code. At step 530, the computing platform may store the encoded result of the input data and the superposition collapse value associated with the input data in a data store. At step 535, the computing platform may transmit a notification to the user computing device of an encryption status of the input data.

Continuing to FIG. 5B, at step 540, the computing platform may receive, from a user computing device, second input data corresponding to the input data. At step 545, the computing platform may convert, using quantum computing, the second input data into a second set of quantum bits. At step 550, the computing platform may extract the stored superposition collapse value associated with the input data. At step 555, the computing platform may collapse, using quantum computing, superpositions of the second set of quantum bits based on the stored superposition collapse value. At step 560, the computing platform may obtain a second encoded result of the second input data by determining, using quantum computing, quantum states of the collapsed second set of quantum bits. At step 565, the computing platform may convert the second encoded result into alphanumeric code. At step 570, the computing platform may compare the second encoded result to the stored encoded result. At step 575, a determination may be made as to whether the second encoded result matches the stored encoded result. Responsive to determining that the second encoded result matches the stored encoded result, the user may be authenticated at step 580. Responsive to determining that the second encoded result does not match the stored encoded result, additional authentication data may be requested at step 585.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   receive, via the communication interface, from a user computing device, input data and a superposition collapse value associated with the input data, wherein the superposition collapse value includes a threshold percentage indicating a percentage of quantum bits to be collapsed, and wherein the threshold percentage is at least 75%;
   convert, using quantum computing, the input data into a set of quantum bits;
   collapse, using quantum computing, superpositions of the set of quantum bits based on the superposition collapse value, wherein collapsing the superpositions includes forcing each quantum bit of the set of quantum bits to take a single value;
   obtain, using quantum computing, an encoded result of the input data by determining, using quantum computing, quantum states of the collapsed set of quantum bits;
   convert the encoded result of the input data into alphanumeric code; and
   store the encoded result of the input data and the superposition collapse value associated with the input data in a data store.

2. The computing platform of claim 1, further including instructions that, when executed, cause the computing platform to:
   receive, via the communication interface, from a user computing device, second input data corresponding to the input data;
   convert, using quantum computing, the second input data into a second set of quantum bits;
   extract the stored superposition collapse value associated with the input data;
   collapse, using quantum computing, superpositions of the second set of quantum bits based on the stored superposition collapse value;
   obtain a second encoded result of the second input data by determining, using quantum computing, quantum states of the collapsed second set of quantum bits;
   convert the second encoded result into alphanumeric code;
   compare the second encoded result to the stored encoded result; and
   responsive to determining that the second encoded result matches the stored encoded result, authenticate the user.

3. The computing platform of claim 2, further including instructions that, when executed, cause the computing platform to:
   responsive to determining that the second encoded result does not match the stored encoded result, generate a request for additional authentication data.

4. The computing platform of claim 1, wherein the input data includes one or more of: a user name, a password, an Internet Protocol address, or a domain name.

5. The computing platform of claim 1, further including instructions that, when executed, cause the computing platform to:
   transmit, via the communication interface, a notification to the user computing device of an encryption status of the input data, wherein transmitting the notification includes causing the notification to display on the user computing device.

6. The computing platform of claim 1, wherein the storing includes storing the encoded result and the superposition collapse value in a cloud database.

7. The computing platform of claim 1, wherein the storing includes storing the encoded result and the superposition collapse value in a persistent data store.

8. A method, comprising:
   at a computing platform comprising at least one processor, a communication interface, and memory:
   receiving, by the at least one processor, via the communication interface, from a user computing device, input data and a superposition collapse value associated with the input data, wherein the superposition collapse value includes a threshold percentage indicating a percentage of quantum bits to be collapsed, and wherein the threshold percentage is at least 75%;
   converting, by the at least one processor, using quantum computing, the input data into a set of quantum bits;
   collapsing, by the at least one processor, using quantum computing, superpositions of the set of quantum bits based on the superposition collapse value, wherein collapsing the superpositions includes forcing each quantum bit of the set of quantum bits to take a single value;
   obtaining, by the at least one processor, using quantum computing, an encoded result of the input data by determining, using quantum computing, quantum states of the collapsed set of quantum bits;

converting, by the at least one processor, the encoded result of the input data into alphanumeric code; and storing, by the at least one processor, the encoded result of the input data and the superposition collapse value associated with the input data in a data store.

9. The method of claim 8, further comprising:

receiving, by the at least one processor, via the communication interface, from a user computing device, second input data corresponding to the input data;

converting, by the at least one processor, using quantum computing, the second input data into a second set of quantum bits;

extracting, by the at least one processor, the stored superposition collapse value associated with the input data;

collapsing, by the at least one processor, using quantum computing, superpositions of the second set of quantum bits based on the stored superposition collapse value;

obtaining, by the at least one processor, a second encoded result of the second input data by determining, using quantum computing, quantum states of the collapsed second set of quantum bits;

converting, by the at least one processor, the second encoded result into alphanumeric code;

comparing, by the at least one processor, the second encoded result to the stored encoded result; and responsive to determining that the second encoded result matches the stored encoded result, authenticating, by the at least one processor, the user.

10. The method of claim 9, further comprising:

responsive to determining that the second encoded result does not match the stored encoded result, generating, by the at least one processor, a request for additional authentication data.

11. The method of claim 8, wherein the input data includes one or more of: a user name, a password, an Internet Protocol address, or a domain name.

12. The method of claim 8, further comprising:

transmitting, by the at least one processor, via the communication interface, a notification to the user computing device of an encryption status of the input data, wherein transmitting the notification includes causing the notification to display on the user computing device.

13. The method of claim 8, wherein the storing includes storing the encoded result and the superposition collapse value in a cloud database.

14. The method of claim 8, wherein the storing includes storing the encoded result and the superposition collapse value in a persistent data store.

15. One or more non-transitory computer-readable media storing instructions that, when executed by a computing platform comprising at least one processor, memory, and a communication interface, cause the computing platform to:

receive, via the communication interface, from a user computing device, input data and a superposition collapse value associated with the input data, wherein the superposition collapse value includes a threshold percentage indicating a percentage of quantum bits to be collapsed, and wherein the threshold percentage is at least 75%;

convert, using quantum computing, the input data into a set of quantum bits;

collapse, using quantum computing, superpositions of the set of quantum bits based on the superposition collapse value, wherein collapsing the superpositions includes forcing each quantum bit of the set of quantum bits to take a single value;

obtain, using quantum computing, an encoded result of the input data by determining, using quantum computing, quantum states of the collapsed set of quantum bits;

convert the encoded result of the input data into alphanumeric code; and store the encoded result of the input data and the superposition collapse value associated with the input data in a data store.

16. The one or more non-transitory computer-readable media of claim 15, wherein the instructions, when executed by the computing platform, further cause the computing platform to:

receive, via the communication interface, from a user computing device, second input data corresponding to the input data;

convert, using quantum computing, the second input data into a second set of quantum bits;

extract the stored superposition collapse value associated with the input data;

collapse, using quantum computing, superpositions of the second set of quantum bits based on the stored superposition collapse value;

obtain a second encoded result of the second input data by determining, using quantum computing, quantum states of the collapsed second set of quantum bits;

convert the second encoded result into alphanumeric code;

compare the second encoded result to the stored encoded result; and responsive to determining that the second encoded result matches the stored encoded result, authenticate the user.

17. The one or more non-transitory computer-readable media of claim 16, wherein the instructions, when executed by the computing platform, further cause the computing platform to:

responsive to determining that the second encoded result does not match the stored encoded result, generate a request for additional authentication data.

18. The one or more non-transitory computer-readable media of claim 15, wherein the input data includes one or more of: a user name, a password, an Internet Protocol address, or a domain name.

19. The one or more non-transitory computer-readable media of claim 15, wherein the instructions, when executed by the computing platform, further cause the computing platform to:

transmit, via the communication interface, a notification to the user computing device of an encryption status of the input data, wherein transmitting the notification includes causing the notification to display on the user computing device.

20. The one or more non-transitory computer-readable media of claim 15, wherein the storing includes storing the encoded result and the superposition collapse value in a cloud database.

* * * * *